(12) United States Patent
Matsumoto et al.

(10) Patent No.: US 9,519,127 B2
(45) Date of Patent: Dec. 13, 2016

(54) ZOOM LENS

(71) Applicant: HAMAMATSU PHOTONICS K.K., Hamamatsu-shi, Shizuoka (JP)

(72) Inventors: Naoya Matsumoto, Hamamatsu (JP); Takashi Inoue, Hamamatsu (JP); Yuu Takiguchi, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 14/394,148

(22) PCT Filed: Apr. 18, 2013

(86) PCT No.: PCT/JP2013/061517
§ 371 (c)(1),
(2) Date: Oct. 13, 2014

(87) PCT Pub. No.: WO2013/157607
PCT Pub. Date: Oct. 24, 2013

(65) Prior Publication Data
US 2015/0085373 A1    Mar. 26, 2015

(30) Foreign Application Priority Data

Apr. 20, 2012 (JP) ................. 2012-096817

(51) Int. Cl.
*G02B 15/14* (2006.01)
*G02B 17/08* (2006.01)
(Continued)

(52) U.S. Cl.
CPC ......... *G02B 17/0896* (2013.01); *G02B 3/0081* (2013.01); *G02B 15/00* (2013.01);
(Continued)

(58) Field of Classification Search
CPC ... G02B 13/18; G02B 15/161; G02B 27/1026; G02B 17/0896; G02B 21/025
(Continued)

(56) References Cited

U.S. PATENT DOCUMENTS 5,640,214 A    6/1997  Florence
2006/0250580 A1 11/2006 Silverstein et al.
(Continued)

FOREIGN PATENT DOCUMENTS

CN    1912672    2/2007
CN    101057254  10/2007
(Continued)

OTHER PUBLICATIONS

Ma, Haotong, et al. "Near-diffraction-limited annular flattop beam shaping with dual phase only liquid crystal spatial light modulators," Optics Express, vol. 18, No. 8, Apr. 12, 2010, pp. 8251-8260.*
(Continued)

*Primary Examiner* — Mahidere Sahle
(74) *Attorney, Agent, or Firm* — Drinker Biddle & Reath LLP

(57) ABSTRACT

A zoom lens includes a first lens unit including one of an SLM or a VFL, a second lens unit being optically coupled between the first lens unit and a focal plane and including one of an SLM or a VFL, and a control unit controlling focal lengths of the first and second lens units. A distance between the first lens unit and the second lens unit and a distance between the second lens unit and the focal plane are invariable. The control unit changes a magnification ratio of the zoom lens by changing the focal lengths of the first and second lens units.

6 Claims, 8 Drawing Sheets

(51) Int. Cl.
*G02B 15/00* (2006.01)
*G02B 3/00* (2006.01)
*G02B 27/00* (2006.01)
*G02B 21/00* (2006.01)
*G02B 5/32* (2006.01)

(52) U.S. Cl.
CPC .............. *G02B 5/32* (2013.01); *G02B 21/002* (2013.01); *G02B 27/0025* (2013.01)

(58) Field of Classification Search
USPC ................. 359/665–667, 676–705, 819–830
See application file for complete search history.

(56) References Cited

U.S. PATENT DOCUMENTS

| | | | |
|---|---|---|---|
| 2006/0250581 | A1 | 11/2006 | Silverstein et al. |
| 2008/0180806 | A1 | 7/2008 | Dobrusskin et al. |
| 2010/0053741 | A1* | 3/2010 | Sander ................. G02B 21/025 359/376 |
| 2011/0128555 | A1* | 6/2011 | Rotschild ........... G02B 27/2271 356/625 |

FOREIGN PATENT DOCUMENTS

| | | | |
|---|---|---|---|
| CN | 101151556 | 3/2008 | |
| CN | 101171846 | 4/2008 | |
| CN | 102150072 | 8/2011 | |
| JP | 2001-042275 | 2/2001 | |
| JP | 2007428085 | 5/2007 | |
| JP | 2008-535012 | 8/2008 | |
| WO | WO 2005/006053 | 1/2005 | |
| WO | WO 2006/035775 | 4/2006 | |
| WO | WO 2006103290 A1 * | 10/2006 | ............... G02B 3/14 |
| WO | WO 2011/046035 | 4/2011 | |

OTHER PUBLICATIONS

"Saishin Kogaku Gijutsu Handbook/Latest Optical Technology Handbook", Asakura Publishing Co., Ltd., Part IV, section 1.3.2 c, with attached partial English Language Translation.

English-language translation of International Preliminary Report on Patentability (IPRP) dated Oct. 30, 2014 that issued in WO Patent Application No. PCT/JP2013/061517.

* cited by examiner

Fig.3
(a)
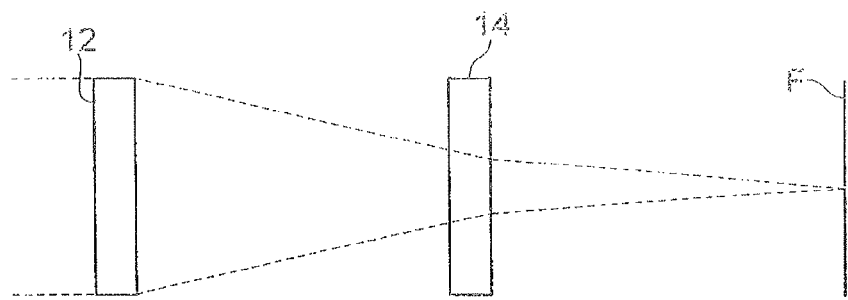
(b)
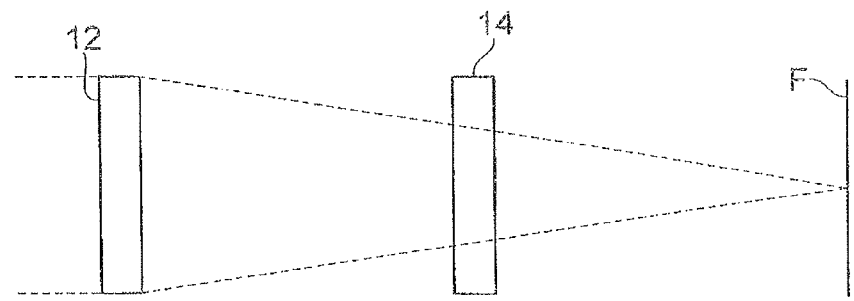
(c)
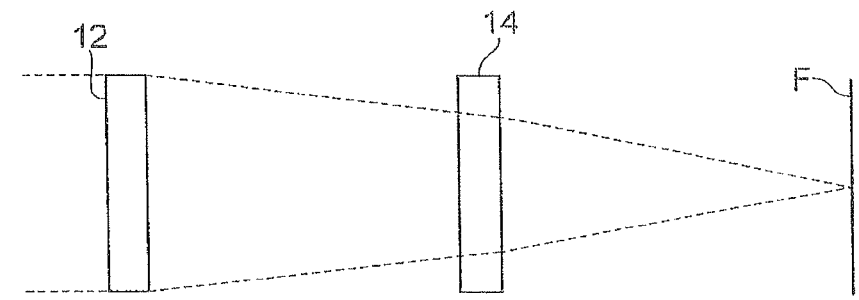

Fig.4
(a)
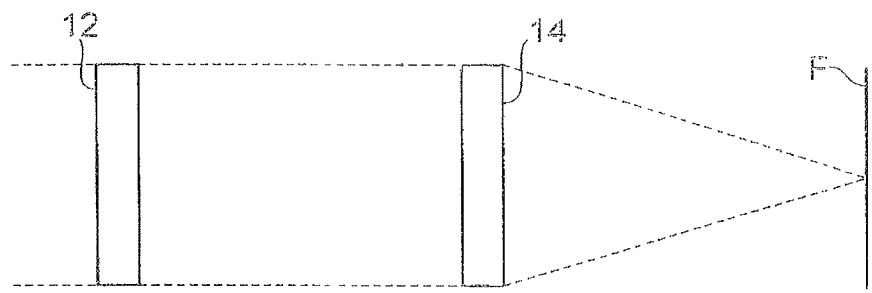
(b)
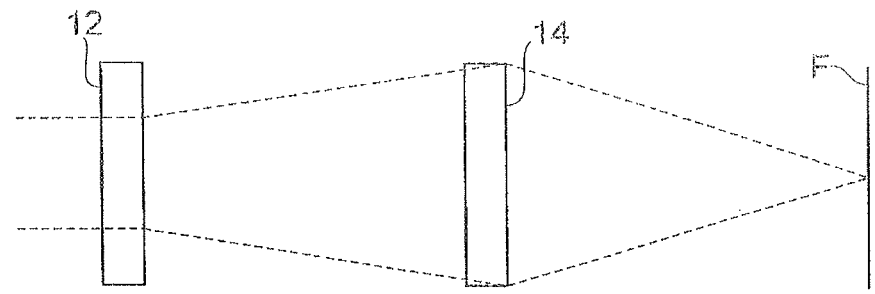

Fig. 5
(a)
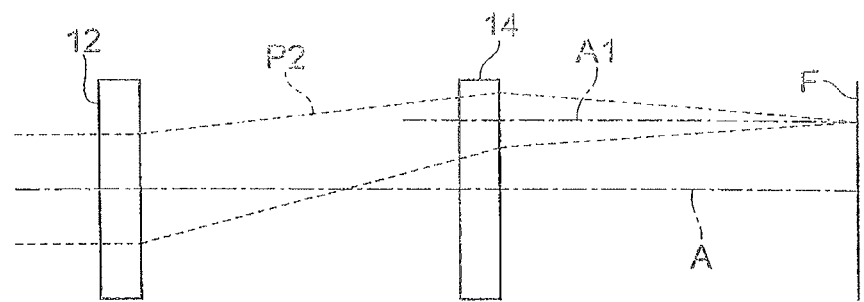
(b)
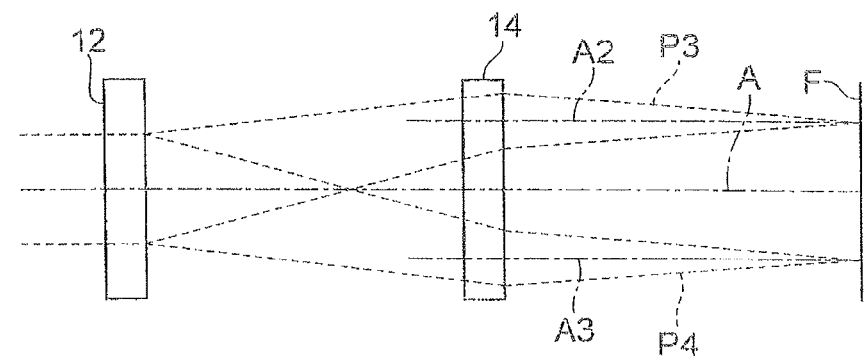
(c)
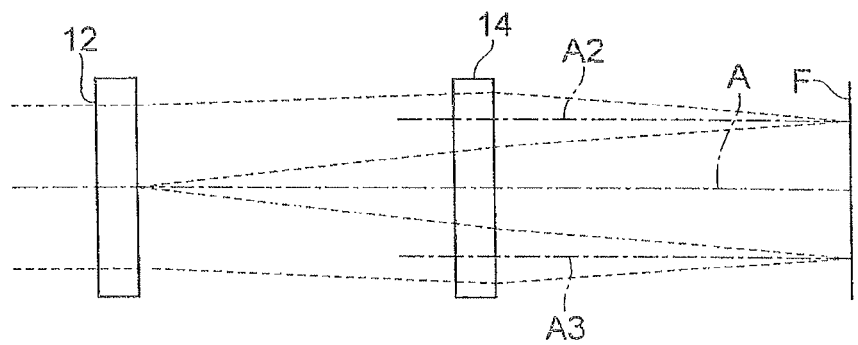

ZOOM LENS

TECHNICAL FIELD

The present invention relates to a zoom lens.

BACKGROUND ART

A zoom lens means a lens which is capable of successively changing its focal length while keeping a focal position of an entire lens system constant. Generally, in order to configure a zoom lens, it is necessary to relatively move at least two groups of lenses on an optical axis. That is, when only one group is relatively moved, in the optical system composed of the two groups of lenses, it is possible to change a combined focal length, meanwhile a focal position as well is changed. On the other hand, it is possible to change a combined focal length without changing a focal position by moving both of the two groups (refer to Non-Patent Document 1).

CITATION LIST

Non Patent Literature

Non-Patent Document 1: Asakura Publishing Co., Ltd. "Saishin Kogaku Gijutsu Handbook (Latest Optical Technology Handbook)" Part IV, section 1.3.2 c

SUMMARY OF INVENTION

Technical Problem

As described above, in the conventional zoom lens composed of a plurality of lens groups, it is necessary to mechanically move the lens groups in an optical axis direction in order to change a magnification ratio. However, in order to improve a positional accuracy at the time of mechanically moving the lenses, an extremely complex mechanism is required. Further, because it takes a given time for moving the lens groups, it is difficult to shorten a required time at the time of changing a magnification ratio.

The present invention has been achieved in view of the above problem, and an object thereof is to provide a zoom lens which is able to be easily configured, and is capable of shortening a required time at the time of changing a magnification ratio.

Solution to Problem

In order to solve the above-described problem, a zoom lens according to the present invention includes a first lens unit including one of a spatial light modulator or a vari-focal lens, a second lens unit being optically coupled between the first lens unit and a focal plane of the zoom lens, and including one of a spatial light modulator or a vari-focal lens, and a control unit controlling focal lengths of the first lens unit and the second lens unit, and in the zoom lens, a distance between the first lens unit and the second lens unit, and a distance between the second lens unit and the focal plane are both invariable, and the control unit changes a magnification ratio of the zoom lens by changing the focal lengths of the first lens unit and the second lens unit. Specifically, for example, the control unit controls the focal lengths of the first lens unit and the second lens unit by providing a lens pattern to a spatial light modulator, or by controlling a focal length of a vari-focal lens.

In this zoom lens, in place of the two or more lens groups in the conventional zoom lens, the first lens unit and the second lens unit which are composed of one of the spatial light modulators or vari-focal lenses are disposed. The spatial light modulator and the vari-focal lens are optical components which are capable of changing a focal length without changing a position in an optical axis direction. Therefore, in a state in which a distance between the first lens unit and the second lens unit, and a distance between the second lens unit and the focal plane are fixed, it is possible to arbitrarily change a focal length of the entire zoom lens system, to change a magnification ratio. Further, these optical components are capable of changing a focal length in an extremely short time according to an electrical signal from the control unit. Accordingly, in accordance with the above-described zoom lens, it is possible to shorten a required time at the time of changing a magnification ratio. Further, because a complex mechanism for moving lens groups is not required, it is possible to easily configure the entire zoom lens system.

Advantageous Effects of Invention

In accordance with the zoom lens according to the present invention, it is possible to easily configure the zoom lens, and shorten a required time at the time of changing a magnification ratio.

BRIEF DESCRIPTION OF DRAWINGS

FIG. 3 includes (a) a diagram schematically showing a situation of imaging corresponding to the Case 1 shown in Table 2, (b) diagram schematically showing a situation of imaging corresponding to the Case 2 shown in Table 2, and (c) a diagram schematically showing a situation of imaging corresponding to the Case 3 shown in Table 2.

FIG. 4 includes (a) a diagram schematically showing a situation of imaging corresponding to the Case 4 shown in Table 2, and (b) a diagram schematically showing a situation of imaging corresponding to the Case 5 shown in Table 2.

FIG. 5 includes diagrams showing examples of operations of the zoom lens according to the first embodiment.

DESCRIPTION OF EMBODIMENTS

Hereinafter, embodiments of a zoom lens according to the present invention will be described in detail with reference to the accompanying drawings. In addition, in the description of the drawings, the same components are denoted by the same reference symbols, and overlapping descriptions will be omitted.

First Embodiment

Figure 1:
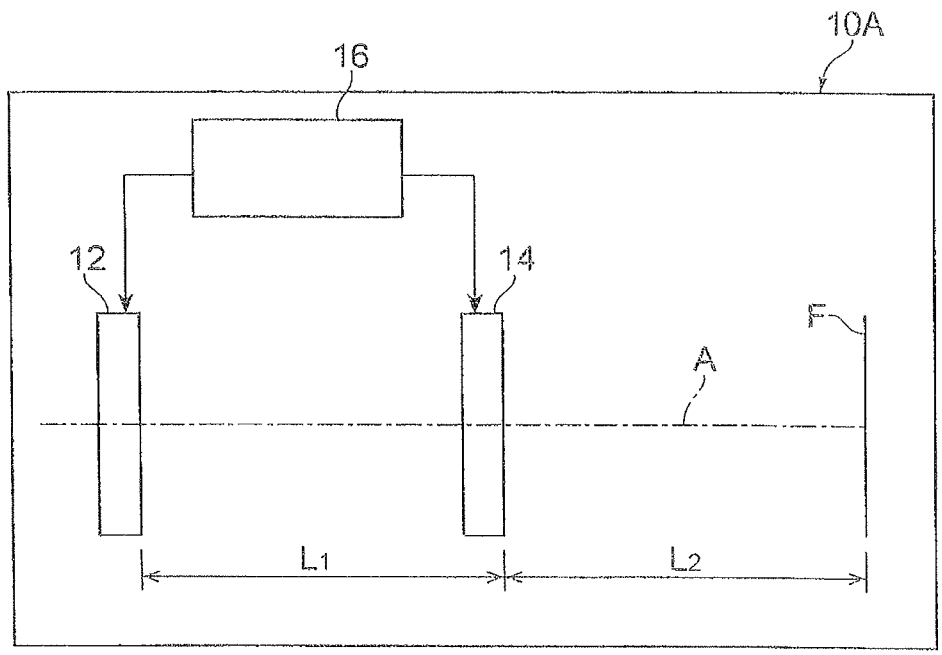
FIG. 1 is a diagram showing a configuration of a zoom lens according to a first embodiment.

FIG. 1 is a diagram showing a configuration of a zoom lens 10A according to a first embodiment of the present invention. The zoom lens 10A according to the present embodiment includes a first lens unit 12, a second lens unit 14, and a control unit 16. The first lens unit 12 and the second lens unit 14 are disposed in line in a direction along a predetermined optical axis A intersecting with a focal plane F of the zoom lens 10A, and the second lens unit 14 is optically coupled between the first lens unit 12 and the focal plane F.

The first lens unit 12 includes one of a spatial light modulator (SLM: Spatial Light Modulator) or a vari-focal lens (VFL: Vari-Focal Lens). Further, in the same way, the second lens unit 14 as well includes one of a spatial light modulator or a vari-focal lens. That is, there are the following four patterns as a combination of the first lens unit 12 and the second lens unit 14.

TABLE 1

|  | First lens unit | Second lens unit |
| --- | --- | --- |
| Pattern 1 | Spatial light modulator | Spatial light modulator |
| Pattern 2 | Spatial light modulator | Vari-focal lens |
| Pattern 3 | Vari-focal lens | Spatial light modulator |
| Pattern 4 | Vari-focal lens | Vari-focal lens |

As a spatial light modulator which is usable as the first lens unit 12 or the second lens unit 14, there is a phase-modulation type spatial light modulator, for example, a refractive-index changing material type SLM (for example, as an SLM using a liquid crystal, an LCOS (Liquid Crystal on Silicon) type, an LCD (Liquid Crystal Display), or the like), a segment mirror type SLM, a continuous deformable mirror type SLM, or the like. A refractive-index changing material type SLM, a segment mirror type SLM, and a continuous deformable mirror type SLM function as a lens which is provided with a variety of lens patterns by applying a voltage, an electric current, or writing light, thereby having an arbitrary focal length.

In addition, a transmission type spatial light modulator is exemplified in the present embodiment, meanwhile, the spatial light modulator may be a reflection type spatial light modulator. Further, as a vari-focal lens as the first lens unit 12 or the second lens unit 14, a lens which is capable of arbitrarily changing a refractive index of an optical path such as a liquid crystal or an electro-optic crystal, or capable of changing its shape may be preferably used. In these vari-focal lenses, a focal length is arbitrarily controlled by applying a voltage or an electric current.

Further, different from the conventional zoom lens, in the zoom lens 10A according to the present embodiment, a distance $L_1$ between the first lens unit 12 and the second lens unit 14, and a distance $L_2$ between the second lens unit 14 and the focal plane F are both invariable, and the positions of the first lens unit 12 and the second lens unit 14 are relatively fixed with respect to the focal plane F.

The control unit 16 controls the focal lengths of the first lens unit 12 and the second lens unit 14. In the case where the first lens unit 12 (the second lens unit 14) is a spatial light modulator, the control unit 16 provides an electrical signal (a lens pattern) for driving the respective pixels of the spatial light modulator to the first lens unit 12 (the second lens unit 14). Further, in the case where the first lens unit 12 (the second lens unit 14) is a vari-focal lens, the control unit 16 provides an electrical signal for controlling a focal length of this vari-focal lens to the first lens unit 12 (the second lens unit 14). In the zoom lens 10A, the control unit 16 changes the focal lengths of the first lens unit 12 and the second lens unit 14 in this way, thereby changing its magnification ratio. In addition, the control unit 16 may be disposed in a housing in which the first lens unit 12 and the second lens unit 14 are housed, or may be disposed outside the housing.

For example, in the case where spatial light modulators are disposed respectively in the first lens unit 12 and the second lens unit 14, the control unit 16 displays the lenses with the focal lengths $f_1$ and $f_2$ respectively on these spatial light modulators, so as to focus on the predetermined focal plane F. Here, it is assumed that collimated light is incident from the front face (a surface on the opposite side to a surface facing the second lens unit 14) of the first lens unit 12. At this time, for example, given that the focal length $f_1$ of the first lens unit 12 is infinite, and the $f_2$ of the second lens unit 14 is equal to the distance $L_2$, a combined focal length $f_c$ by the first lens unit 12 and the second lens unit 14 is equal to the distance $L_2$. In this case, the first lens unit 12 does not function as a lens, and allows the collimated light to directly pass through as is. Further, for example, given that the focal length $f_1$ of the first lens unit 12 is a distance $(L_1+L_2)$ from the first lens unit 12 up to the focal plane F, and the $f_2$ of the second lens unit 14 is infinite, the combined focal length $f_c$ by the first lens unit 12 and the second lens unit 14 is $(L_1+L_2)$. These are particular cases, however, in the present embodiment, the control unit 16 sets the focal lengths $f_1$ and $f_2$ of the first lens unit 12 and the second lens unit 14 to various lengths, thereby it is possible to arbitrarily control a combined focal length by the first lens unit 12 and the second lens unit 14.

Here, because the mutual distances between the first lens unit 12, the second lens unit 14, and the focal plane F are fixed in the optical system of the zoom lens 10A, relationships are created among the focal lengths $f_1$ and $f_2$, and the combined focal length $f_c$. Hereinafter, the relationships will be described.

Figure 2:
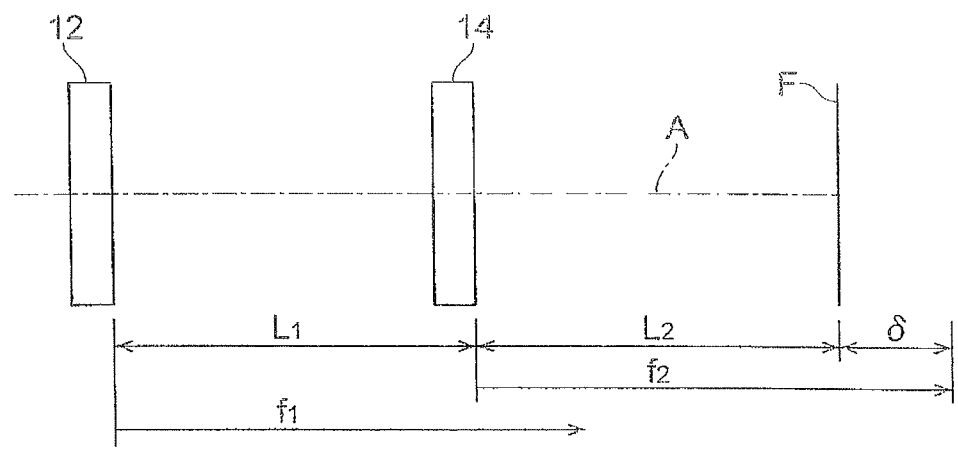
FIG. 2 is a diagram showing the relationship of focal lengths in the zoom lens according to the first embodiment.

Here, as shown in FIG. 2, it is given that a focal length of the first lens unit 12 is $f_1$, and a focal length of the second lens unit 14 is $f_2$. In this optical system, conditions to be satisfied by the focal lengths $f_1$ and $f_2$ in order to change the combined focal length $f_c$ without changing the position of the focal plane F are determined. The combined focal length $f_c$ of this optical system is expressed as the following formula (1).

[Formula 1]

$$f_c = \frac{f_1 f_2}{f_1 + f_2 - L_1} \quad (1)$$

Further, the distance $L_2$, the focal length $f_2$, and $\delta$ in association with a position of the focal plane F have the following relationship.

[Formula 2]

$$\delta = L_2 - f_2 = \frac{f_2^2}{L_1 - f_1 + f_2} \quad (2)$$

When the formula (2) is modified, to solve the focal length $f_2$, the following formula (3) is derived.

[Formula 3]

$$f_2 = \frac{(f_1 - L_1)L_2}{f_1 - L_1 - L_2} \quad (3)$$

When the formula (3) is substituted for the formula (1), to solve the focal length $f_1$, the following formula (4) is derived.

[Formula 4]

$$f_1 = \frac{f_c L_1}{f_c - L_2} \quad (4)$$

In the same way, when the combined focal length $f_c$ is solved, the following formula (5) is derived.

[Formula 5]

$$f_c = \frac{f_1 L_2}{f_1 - L_1} \quad (5)$$

When the formula (4) is substituted for the formula (3), the following formula (6) is derived.

[Formula 6]

$$f_2 = \frac{L_1 L_2}{L_1 + L_2 - f_c} \quad (6)$$

From the above-described formulas (4) and (6), it is understood that, when the desired combined focal length $f_c$ and the distances $L_1$ and $L_2$ are given, it is possible to calculate the focal lengths $f_1$ and $f_2$. Further, it is understood that it is possible to prove its calculation result by use of the formula (5). The control unit 16 includes a function of focal length calculation, and calculates the focal lengths $f_1$ and $f_2$ of the first and second lens units 12 and 14 on the basis of the combined focal length $f_c$ by the first and second lens units 12 and 14, the distance $L_1$ between the first lens unit 12 and the second lens unit 14, and the distance $L_2$ between the second lens unit 14 and the focal plane F. Further, the control unit 16 performs control of changing the respective focal lengths of the first and second lens units 12 and 14 so that their focal lengths become the calculated focal lengths $f_1$ and $f_2$. Further, the control unit 16 may calculate the combined focal length $f_c$ on the basis of a desired magnification ratio in focal length calculation. In addition, in the cases where the denominators are 0 in the formulas (4) and (6), their values are indefinite, however, these cases correspond to the aforementioned examples (the cases where one of the focal lengths of the first lens unit 12 and the second lens unit 14 is infinite). That is, the denominator of the formula (6) becomes 0 in the case where the focal length $f_1 = (L_1 + L_2)$, and the focal length $f_2$ is infinite, and the denominator of the formula (4) becomes 0 in the case where the focal length $f_1$ is infinite, and the focal length $f_2 = L_2$. In addition, the firsts lens unit 12 and the second lens unit 14 are determined as a concave lens or a convex lens according to the lengths of the focal lengths $f_1$ and $f_2$. It is a convex lens in the case where the values of the focal lengths $f_1$ and $f_2$ are positive, and it is a concave lens in the case where the values of the focal lengths $f_1$ and $f_2$ are negative.

Table 2 is a table showing the relationship among the values of the focal lengths $f_1$ and $f_2$, and the value of the combined focal length $f_c$ corresponding thereto. Further, (a) in FIG. 3, (b) in FIG. 3, (c) in FIG. 3, (a) in FIG. 4, and (b) in FIG. 4 are diagrams schematically showing the situations of imaging corresponding to the 5 Cases 1 to 5 shown in Table 2.

TABLE 2

| | $f_c$ | $f_1$ | $f_2$ | Magnification |
|---|---|---|---|---|
| Case 1 | $f_c > L_1 + L_2$ | Positive | Negative | Ultralow magnification |
| Case 2 | $f_c = L_1 + L_2$ | $L_1 + L_2$ | ∞ | Low magnification |
| Case 3 | $L_1 + L_2 > f_c > L_2$ | Positive | Positive | Medium magnification |
| Case 4 | $f_c = L_2$ | ∞ | $L_2$ | High magnification |
| Case 5 | $L_2 > f_c > 0$ | Negative | Positive | Ultrahigh magnification |

Case 1: As shown in Table 2, in the Case 1, the focal length $f_1$ is positive, the focal length $f_2$ is negative, and the combined focal length $f_c$ is greater than $(L_1 + L_2)$. In such a case, because the numerical aperture (NA) of the second lens unit 14 is minimized as shown in (a) in FIG. 3, the magnification ratio becomes "ultralow magnification."

Case 2: As shown in Table 2, in the Case 2, the focal length $f_1$ $(L_1 + L_2)$, and the focal length $f_2$ is infinite. In this case, the combined focal length $f_c(L_1 + L_2)$. In such a case, because the numerical aperture of the second lens unit 14 is small to a certain extent as shown in (b) in FIG. 3, the magnification ratio becomes "low magnification."

Case 3: As shown in Table 2, in the Case 3, the focal lengths $f_1$ and $f_2$ are both positive, and the combined focal length $f_c$ is greater than $L_2$, and smaller than $(L_1 + L_2)$. In such a case, because the numerical aperture of the second lens unit 14 has a certain level of size as shown in (c) in FIG. 3, the magnification ratio becomes "medium magnification."

Case 4: As shown in Table 2, in the Case 4, the focal length $f_1$ is infinite, and the focal length $f_2 = L_2$. In this case, the combined focal length $f_c = L_2$. In such a case, because the numerical aperture of the second lens unit 14 is further increased as shown in (a) in FIG. 4, the magnification ratio becomes "high magnification."

Case 5: As shown in Table 2, in the Case 5, the focal length $f_1$ is negative, the focal length $f_2$ is positive, and the combined focal length $f_c$ is greater than 0, and smaller than $L_2$. In such a case, because the numerical aperture of the second lens unit 14 is maximized as shown in (b) in FIG. 4, the magnification ratio becomes "ultrahigh magnification."

In the zoom lens 10A according to the present embodiment described above, in place of the two or more lens groups in the conventional zoom lens, the first lens unit 12 and the second lens unit 14 which are composed of one of the spatial light modulators or vari-focal lenses are disposed. As described above, the spatial light modulator and the vari-focal lens are optical components which are capable of changing the focal lengths $f_1$ and $f_2$ without changing a position in a direction of the optical axis A. Therefore, in a state in which the distance $L_1$ between the first lens unit 12 and the second lens unit 14, and the distance $L_2$ between the second lens unit 14 and the focal plane F are fixed, it is possible to arbitrarily change the combined focal length $f_c$ of the entire zoom lens system, to change a magnification ratio. Further, these optical components are capable of changing the focal lengths $f_1$ and $f_2$ in an extremely short time according to an electrical signal from the control unit 16. Accordingly, in accordance with the zoom lens 10A of the present embodiment, as compared with the conventional zoom lens, it is possible to considerably shorten a required time at the time of changing a magnification ratio. Further, because a complex mechanism for moving lens groups is not required, it is possible to easily configure the entire zoom lens system.

In addition, in the zoom lens 10A of the present embodiment, it is also possible to perform operations which will be hereinafter described.

<Superimposition of Diffraction Grating Pattern>

In the case where at least one of the first lens unit 12 and the second lens unit 14 is composed of a spatial light modulator, the control unit 16 is capable of presenting a superimposed pattern that a phase pattern such as a variety of diffraction grating patterns is superimposed onto a lens pattern to be provided to both or one of the first lens unit 12 and the second lens unit 14, in the spatial light modulator. In accordance with this, as shown in (a) in FIG. 5 for example, so-called beam steering in which a focal position is moved onto an arbitrary optical axis A1 different from the optical axis A, is made possible. It is possible to realize such a configuration by, for example, providing a lens pattern with which a straight line including a central axis line of light input to the first lens unit 12 and a straight line including a central axis line of light output from the second lens unit 14 are separated from each other, to the spatial light modulator. In such a configuration, it is possible to parallelize the optical axis A1 of the light P2 going between the second lens unit 14 and the focal plane F to the optical axis A of the first lens unit 12 and the second lens unit 14 while inclining an optical axis of the light P2 going between the first lens unit 12 and the second lens unit 14.

Further, due to the control unit 16 presenting a superimposed pattern that a phase pattern such as a predetermined diffraction grating pattern is superimposed on a lens pattern, in the spatial light modulator, as shown in (b) in FIG. 5, it is also possible to perform steering of a plurality of beams, that is, a focal position is moved onto a plurality of optical axes (for example, A2 and A3 in the drawing) different from the optical axis A while forming a plurality of (two in the drawing) optical axes inclined in directions different from each other with respect to the optical axis A between the first lens unit 12 and the second lens unit 14. It is possible to realize such a configuration by, for example, providing a lens pattern with which light output from the second lens unit 14 is split into a plurality of optical paths with respect to light input to the first lens unit 12, to the spatial light modulator. Further, for example, by simultaneously presenting a superimposed pattern composed of phase patterns based on different focal lengths, in the spatial light modulator, it is also possible to make magnification ratios at focal positions on a plurality of optical axes (for example, A2 and A3 in the drawing) different from each other.

In addition, in the configuration shown in (b) in FIG. 5, an objective lens may be disposed between the second lens unit 14 and the focal plane F, so as to match light condensing positions of light beams P3 and P4 to a back focal point of the objective lens. In accordance with this, it is possible to cause the two light beams P3 and P4 which have passed through the objective lens, to interfere with each other, which makes it possible to perform microprocessing by the interference effect. Further, such an interference effect is arbitrarily controlled by changing inclination angles of the optical axes of the light beams P3 and P4 after passing through the objective lens, or the numerical apertures (NA) of the light beams P3 and P4. Further, it is also possible to perform a multi-point processing by use of a plurality of light beams whose numerical apertures are different from each other.

Further, due to the control unit 16 presenting a superimposed pattern that a phase pattern such as a predetermined diffraction grating pattern is superimposed on a lens pattern, in the spatial light modulator, as shown in (c) in FIG. 5, the first lens unit 12 may be split into a plurality of (two in the drawing) regions, and an optical axis inclined (or parallel) with respect to the optical axis A may be formed between each of these regions and the second lens unit 14. In accordance with the configuration shown in (c) in FIG. 5, as compared with the configuration of (b) in FIG. 5, it is possible to make a diffraction angle in the first lens unit 12 smaller, which makes it possible to reduce the burden of the first lens unit 12. Here, the burden of the first lens unit 12 will be described. In the case where the first lens unit 12 is composed of a spatial light modulator (SLM), a lens pattern to be displayed on this SLM is a phase pattern which is called a Fresnel lens pattern. This pattern is derived by the following formula (7).

[Formula 7]

$$\phi(r) = \mod\left(-\frac{\pi r^2}{\lambda f}, 2\pi\right) \tag{7}$$

In the formula (7), r is a distance from the central point of a lens pattern, λ is a wavelength of a beam to be incident, and f is a focal length of a lens. Further, this formula (7) expresses the case where a method of wrapping a phase at 2π (rad) (called phase-wrapping) is used in order to display a Fresnel lens pattern in an SLM which can express phase difference up to 2π (rad). As is clear from this formula (7), a phase becomes steeper as it moves away from the central point of the lens pattern. Therefore, phase-wrapping is frequently caused in the peripheral portion of the lens pattern. Then, when an interval of phase-wrapping becomes shorter than twice the pixel pitch of the SLM, it is no longer possible to express a Fresnel lens pattern. In order to avoid such a phenomenon, in a case where the NA becomes too large, it is preferable to effectively use the light by splitting light into a plurality of regions while limiting the NA by use of the configuration shown in (c) in FIG. 5.

As shown in (a) in FIG. 5 to (c) in FIG. 5, in accordance with the zoom lens 10A of the present embodiment, it is possible to perform, in addition to changing of a focal length, controls such as changing of a focal position on the focal plane F and splitting of a focal point, which have been unable to be performed by a conventional optical lens.

<Superimposition of Hologram Pattern>

In the case where at least one of the first lens unit 12 and the second lens unit 14 is composed of a spatial light modulator, the control unit 16 is capable of superimposing a variety of hologram patterns (phase patterns) which are designed by a calculation method such as an iterative Fourier transform method including a GS method or the like by use of a computer, on a lens pattern to be provided to both or one of the first lens unit 12 and the second lens unit 14. In accordance therewith, it is possible to simultaneously form a plurality of images at positions different from each other.

<Superimposition of Aberration Correction Pattern>

In the case where at least one of the first lens unit 12 and the second lens unit 14 is composed of a spatial light modulator, the control unit 16 is capable of superimposing a phase pattern for correcting aberrations generated by a distortion included in an optical system and a vari-focal lens, onto a lens pattern to be provided to both or one of the first lens unit 12 and the second lens unit 14.

A lens which is disposed separately from the first lens unit 12 and the second lens unit 14, and vari-focal lenses which are used as the first lens unit 12 and the second lens unit 14 may have slight distortions. It is desired to correct aberrations by such distortions in order to accurately perform phase modulation. Accordingly, it is preferable that a pattern for correcting aberrations be superimposed on a lens pattern to be provided to the first lens unit 12 and/or the second lens unit 14. Thereby, it is possible to highly accurately configure an optical system. Further, in accordance with the zoom lens 10A of the present embodiment, in this way, it is also possible to easily configure the entire system without need for a complex lens shaping at the time of correcting aberrations.

The zoom lens 10A according to the present embodiment described above may be used for a Fourier transform hologram reproducing optical system. In that case, one of the first lens unit 12 and the second lens unit 14 may be used as a hologram presenting element as well. When a fixed lens is used as a Fourier transform lens as in the conventional art, a size of a reproduced image is to be fixed, however, by use of the zoom lens 10A according to the present embodiment, it is possible to change a size of a reproduced image.

Further, the zoom lens 10A according to the present embodiment may be used for a lensless optical correlator. In a conventional lensless optical correlator, because its focal length depends on a distance between a spatial light modulator presenting an input pattern and a spatial light modulator presenting a filter pattern, it is impossible to change the focal length, and it has been impossible to switch between a single optical correlator and a parallel optical correlator. In accordance with the zoom lens 10A of the present embodiment, it is possible to switch between a single optical correlator and a parallel optical correlator without changing the layout of the optical components such as the first lens unit 12 and the second lens unit 14. That is, a lens pattern which is provided from the control unit 16 to the first lens unit 12 and the second lens unit 14 is set to a lens array pattern, thereby it is possible to easily realize a parallel optical correlator which carries out an optical correlation operation in parallel.

Further, the zoom lens 10A according to the present embodiment may be used for a microscope. In that case, it is possible to change an observation magnification easily and in a short time. For example, a scanning laser microscope performs raster scanning of laser light which is concentrated by an objective lens or the like on an object, and performs imaging by use of emission of light (for example, fluorescence, reflected light, or scattered light, or the like) generated from the object by the irradiated laser light, meanwhile, by use of the zoom lens 10A according to the present embodiment, it is possible to change a diameter of concentrated laser light easily and in a short time. Accordingly, it is possible to easily control the number of scanning, and it is possible to switch between a method of measuring the entire object relatively roughly and in a short time and a method of minutely measuring only a part of the object over time, as needed. Further, in accordance with the zoom lens 10A of the present embodiment, because it is possible to easily move a focal position (refer to, for example, (a) in FIG. 5 to (c) in FIG. 5), it is possible to easily change an observation position, which makes it significantly easy to handle as compared with the configuration in which the objective lenses with different magnifications are switched as in the conventional art. Further, by using the zoom lens 10A for an imaging optical system in a microscope, it is possible to arbitrarily change a field of view and resolution without changing an imaging position in an optical axis direction.

Further, the zoom lens 10A according to the present embodiment may be used for laser processing. In that case, because it is possible to change a diameter in a longitudinal or transverse direction of a condensed light spot easily and in a short time, it is possible to easily change a shape of a processing trace. Further, it is possible to perform microprocessing by a small condensed light spot, or it is possible to achieve speed-up of processing by enlarging a condensed light spot.

Second Embodiment

Figure 6:
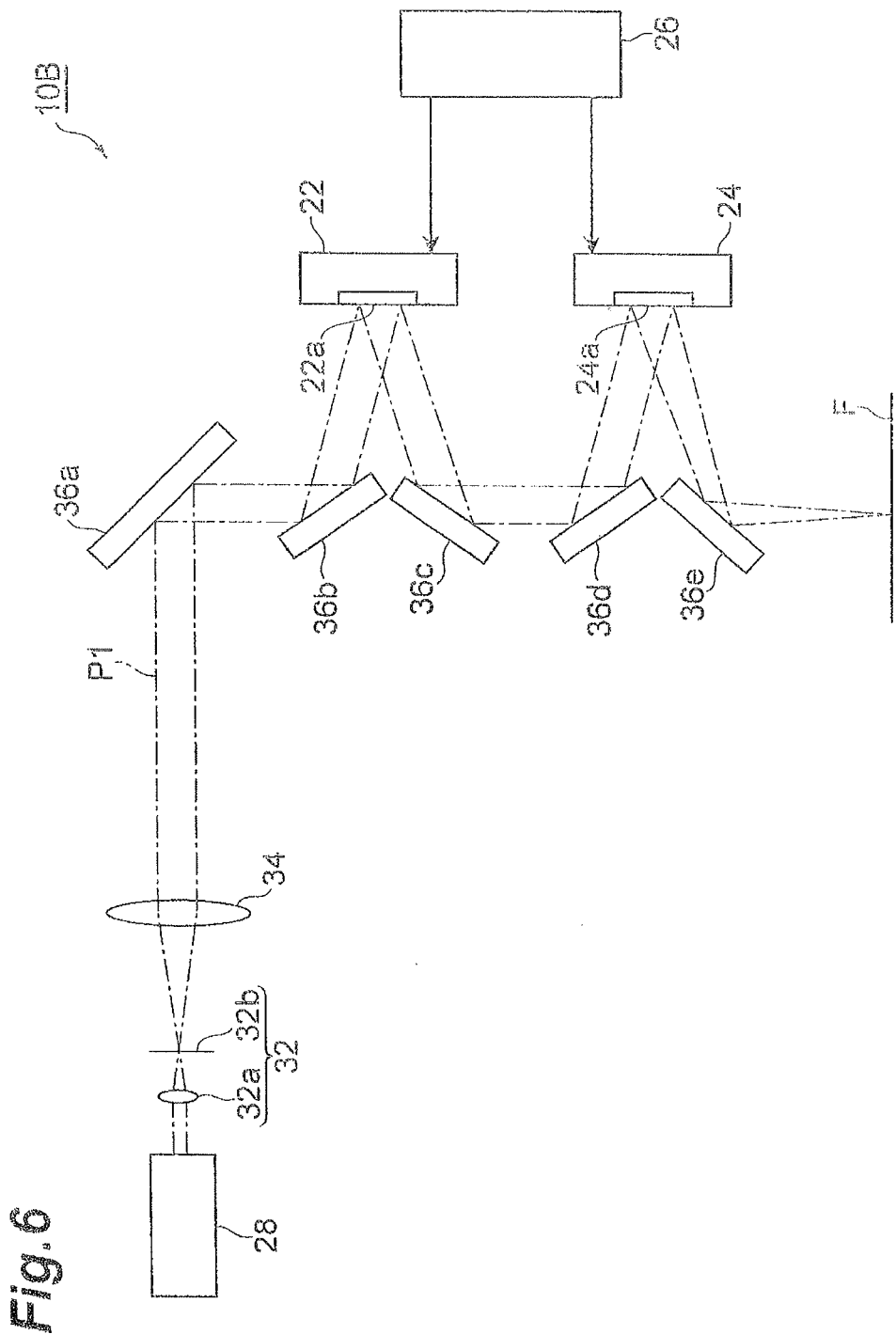
FIG. 6 is a diagram showing a configuration of a zoom lens according to a second embodiment.

FIG. 6 is a diagram showing a configuration of a zoom lens 10B according to a second embodiment of the present invention. The zoom lens 10B according to the present embodiment includes a first lens unit 22, a second lens unit 24, and a control unit 26. The first lens unit 22 and the second lens unit 24 are composed of reflection type spatial light modulators, and respectively have light-reflecting surfaces 22a and 24a. Further, as shown in FIG. 6, the zoom lens 10B may further include a laser light source 28, a spatial filter 32, a collimating lens 34, and reflecting mirrors 36a to 36e serving as reflective elements.

In the present embodiment, the second lens unit 24 is optically coupled between the first lens unit 22 and the focal plane F according to a structure which will be described below. That is, the light-reflecting surface 24a of the second lens unit 24 is optically coupled to the light-reflecting surface 22a of the first lens unit 22 via the reflecting mirrors 36d and 36c serving as a plurality of reflective elements, and is simultaneously optically coupled to the focal plane F via the reflecting mirror 36e. Further, collimated light P1 is incident into the light-reflecting surface 22a of the first lens unit 22 via the reflecting mirrors 36b and 36a. The collimated light P1 is appropriately generated by, for example, such that laser light emitted from the laser light source 28 passes through a condensing lens 32a and a pinhole 32b of the spatial filter 32 so as to eliminate wavefront noise and distortion, and thereafter passes through the collimating lens 34, to be parallelized.

In the zoom lens 10B according to the present embodiment as well, an optical distance between the first lens unit 22 and the second lens unit 24 (that is, a distance from the first lens unit 22 up to the second lens unit 24 via the reflecting mirrors 36c and 36d), and an optical distance between the second lens unit 24 and the focal plane F (that is, a distance from the second lens unit 24 up to the focal plane F via the reflecting mirror 36e) are both invariable, and the positions of the first lens unit 22 and the second lens unit 24 are relatively fixed with respect to the focal plane F.

The control unit 26 controls the focal lengths of the first lens unit 22 and the second lens unit 24. The control unit 26 provides an electrical signal (a lens pattern) for driving the respective pixels of the spatial light modulators to the first lens unit 22 and the second lens unit 24, thereby displaying the lenses with the focal lengths $f_1$ and $f_2$ respectively on these spatial light modulators, so as to focus on the predetermined focal plane F. In the zoom lens 10B, the control unit 26 changes the focal lengths of the first lens unit 22 and the second lens unit 24 in this way, thereby changing its magnification ratio. In addition, the control unit 26 may be disposed in a housing in which the first lens unit 22 and the second lens unit 24 are housed, or may be disposed outside the housing.

As in the present embodiment, the first lens unit and the second lens unit may be composed of reflection type spatial light modulators. Even in such a case, it is possible to exert the same effects as those in the aforementioned first embodiment.

MODIFICATION

Figure 7:
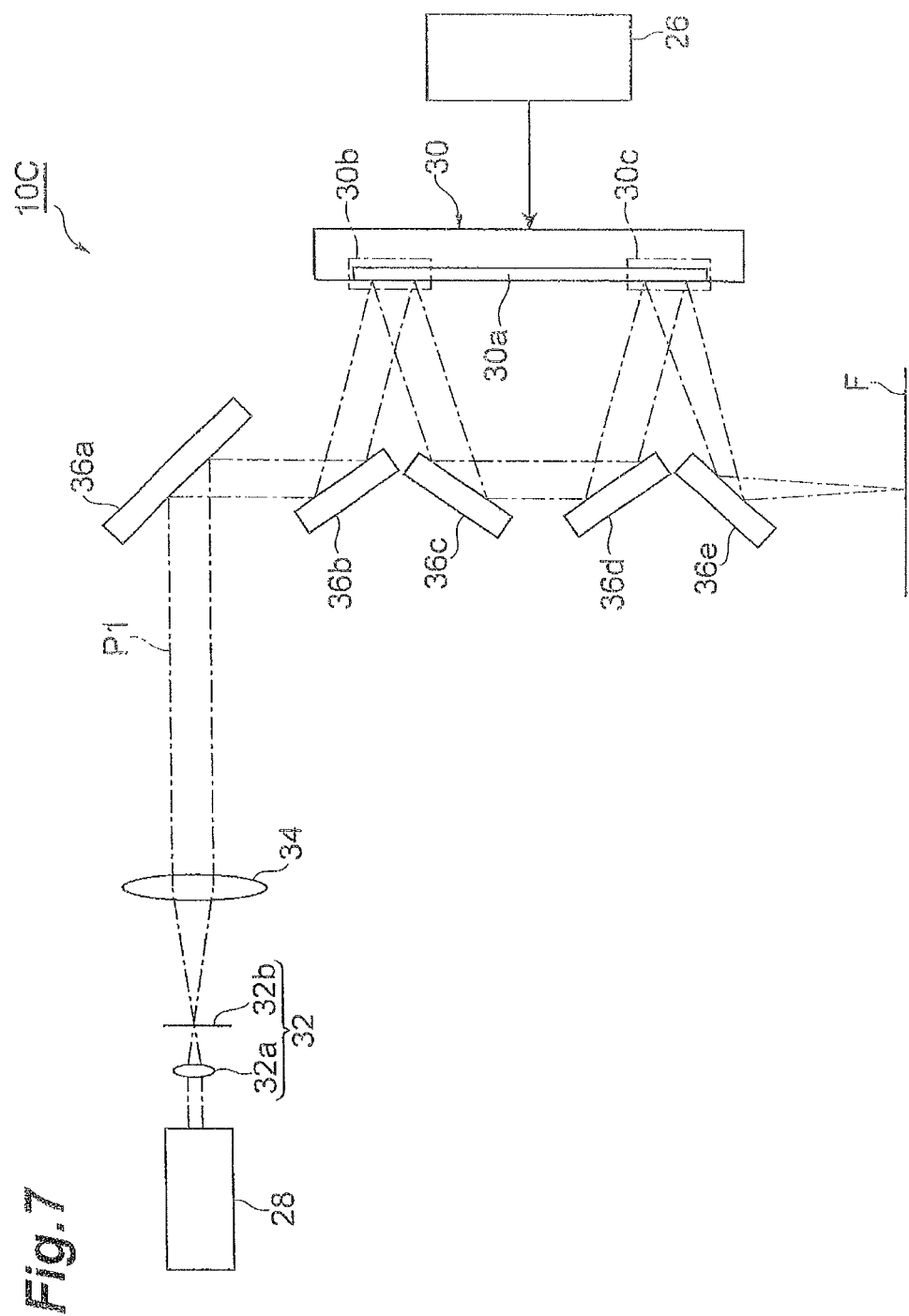
FIG. 7 is a diagram showing a configuration of the zoom lens as a modification of the second embodiment.

FIG. 7 is a diagram showing a configuration of a zoom lens 10C as a modification of the second embodiment. A point of difference between the zoom lens 10C according to the present modification and the second embodiment is the configurations of the first lens unit and the second lens unit. That is, in the present modification, the zoom lens 10C includes a single reflection type spatial light modulator 30, and the first lens unit and the second lens unit are composed of the single reflection type spatial light modulator 30, and a partial region (a first region) of its light-reflecting surface 30a is used as a first lens unit 30b, and another partial region (a second region) is used as a second lens unit 30c. In the present modification, the second lens unit 30c is optically coupled to the first lens unit 30b via the reflecting mirrors 36d and 36c, and is simultaneously optically coupled to the focal plane F via the reflecting mirror 36e. Further, the collimated light P1 is incident into the first lens unit 30b via the reflecting mirrors 36b and 36a.

In the zoom lens 10C according to the present modification as well, an optical distance between the first lens unit 30b and the second lens unit 30c, and an optical distance between the second lens unit 30c and the focal plane F are both invariable, and the positions of the first lens unit 30b and the second lens unit 30e are relatively fixed with respect to the focal plane F.

The control unit 26 controls the focal lengths of the first lens unit 30b and the second lens unit 30c. The control unit 26 provides an electrical signal (a lens pattern) for driving the respective pixels of the spatial light modulator 30 to the spatial light modulator 30, thereby displaying the lenses with the focal lengths $f_1$ and $f_2$ respectively on the first lens unit 30b and the second lens unit 30c, so as to focus on the predetermined focal plane F. In the zoom lens 10C, the control unit 26 changes the focal lengths of the first lens unit 30b and the second lens unit 30c in this way, thereby changing its magnification ratio.

As in the present modification, the first lens unit and the second lens unit may be composed of a common single spatial light modulator. Even in such a case, it is possible to exert the same effects as those in the aforementioned first embodiment.

A zoom lens according to the present invention is not limited to the above-described embodiments and modifications, and other various modifications are possible. For example, FIG. 1 shows only the first lens unit 12 and the second lens unit 14 as the configuration of the zoom lens 10A, however, the zoom lens may include an optical component such as a fixed lens in addition to the first lens unit and the second lens unit. For example, in the case where spatial light modulators are used as the first lens unit and the second lens unit, its focal length has a lower limit. Accordingly, a limit is to be put in a variable range of a focal length of the zoom lens as well. In such a case, it is possible to change a focal length in excess of the limit by appropriately inserting a fixed lens on an optical axis.

Further, in the above-described embodiments and modification, the case in which the light to be incident into the first lens unit is parallel light is exemplified, meanwhile, the light to be incident into the first lens unit is not limited to parallel light, and various light beams may be applied.

Figure 8:
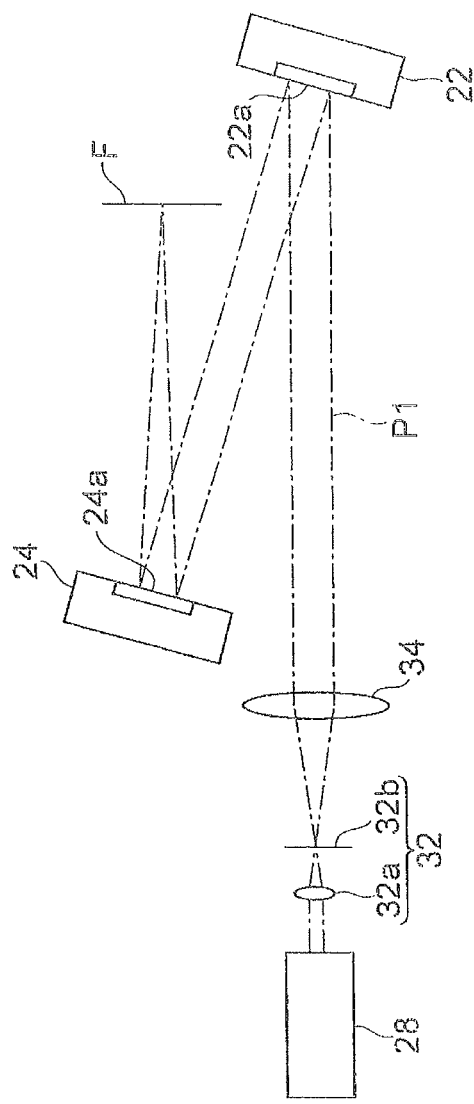
FIG. 8 is a diagram showing a configuration of the zoom lens as another modification of the second embodiment.

Further, in the second embodiment and the modification, as an optical system in which light is incident into and emitted from the first lens unit and the second lens unit, a variety of configurations other than the configurations shown in FIG. 6 and FIG. 7 are possible. For example, an expander may be provided in place of the spatial filter 32 and the collimating lens 34, and the reflecting mirrors 36a to 36e may be replaced with other light reflective optical components such as a triangular prism. Further, as shown in FIG. 8, a configuration without use of reflecting mirrors is possible. Further, in the configuration of FIG. 8, the reflection type spatial light modulator composing the first lens unit 22 and the reflection type spatial light modulator composing the second lens unit 24 are preferably disposed such that their light-reflecting surfaces 22a and 24a are parallel to one another. In this case, it is possible to make the input light and the output light substantially parallel, and make the device relatively compact.

A zoom lens according to the above-described embodiment includes a first lens unit which is composed of one of a spatial light modulator or a vari-focal lens, a second lens unit which is optically coupled between the first lens unit and a focal plane of the zoom lens, and is composed of one of a spatial light modulator or a vari-focal lens, and a control unit that controls focal lengths of the first lens unit and the second lens unit by providing a lens pattern to the spatial light modulator, or by controlling a focal length of the vari-focal lens, and in the zoom lens, a distance between the first lens unit and the second lens unit, and a distance between the second lens unit and the focal plane are both invariable, and the control unit changes a magnification ratio of the zoom lens by changing the focal lengths of the first lens unit and the second lens unit.

Further, the zoom lens may be configured such that at least one of the first lens unit and the second lens unit includes a spatial light modulator. In accordance with this, it is possible to perform, in addition to changing of a focal length, controls such as changing of a focal position on the focal plane and splitting of a focal point, which have been unable to be performed by a conventional optical lens. Such controls are preferably achieved by, for example, such that the control unit superimposes a diffraction grating or a hologram pattern onto the lens pattern to be provided to the spatial light modulator.

Further, in the case where at least one of the first lens unit and the second lens unit is composed of a spatial light modulator, the control unit may superimpose a pattern for correcting aberrations generated in the zoom lens, onto the lens pattern to be provided to the spatial light modulator. In this way, in accordance with the zoom lens, it is also possible to easily configure the entire system without need for a complex lens shaping at the time of correcting aberrations.

Further, a zoom lens according to the above-described embodiment includes a first lens unit including one of a spatial light modulator or a vari-focal lens, a second lens unit being optically coupled between the first lens unit and a focal plane of the zoom lens, and including one of a spatial light modulator or a vari-focal lens, and a control unit controlling focal lengths of the first lens unit and the second lens unit, and in the zoom lens, a distance between the first lens unit and the second lens unit, and a distance between the second lens unit and the focal plane are both invariable, and the control unit changes a magnification ratio of the zoom lens by changing the focal lengths of the first lens unit and the second lens unit.

Here, specifically, for example, in the case where the lens unit (the first lens unit or the second lens unit) is composed of a spatial light modulator, the control unit controls a focal length of the lens unit by providing a lens pattern to the spatial light modulator. Further, in the case where the lens unit is composed of a vari-focal lens, the control unit controls a focal length of the lens unit by controlling a focal length of the vari-focal lens.

Further, in the above-described configuration, the zoom lens may be configured such that at least one of the first lens unit and the second lens unit includes a spatial light modulator, and the control unit provides a lens pattern to the spatial light modulator.

Further, the zoom lens may be configured such that the first lens unit and the second lens unit respectively include reflection type spatial light modulators. Further, in this case, the zoom lens may be configured such that the reflection type spatial light modulator composing the first lens unit and the reflection type spatial light modulator composing the second lens unit are disposed such that their light-reflecting surfaces are parallel to one another.

Further, in the zoom lens, the first lens unit and the second lens unit may include a single reflection type spatial light modulator, and a partial region of its light-reflecting surface may be used as the first lens unit, and another partial region may be used as the second lens unit.

Further, the zoom lens may be configured to include a plurality of reflective elements, and such that the second lens unit is optically coupled to the first lens unit via the plurality of reflective elements.

Further, the zoom lens may be configured such that the spatial light modulator is a transmission type spatial light modulator.

Further, the zoom lens may be configured such that the control unit provides the lens pattern with which a straight line including a central axis line of light input to the first lens unit and a straight line including a central axis line of light output from the second lens unit are separated from one another, to the spatial light modulator.

Further, the zoom lens may be configured such that the control unit provides the lens pattern with which, with respect to light input to the first lens unit, light output from the second lens unit is split into a plurality of optical paths, to the spatial light modulator.

Further, the zoom lens may be configured such that the control unit superimposes a pattern for correcting aberrations generated in the zoom lens, onto the lens pattern to be provided to the spatial light modulator.

Further, the zoom lens may be configured such that the control unit calculates a focal length of the first lens unit and a focal length of the second lens unit on the basis of a combined focal length by the first lens unit and the second lens unit, the distance between the first lens unit and the second lens unit, and the distance between the second lens unit and the focal plane, and changes the focal lengths of the first lens unit and the second lens unit so that their focal lengths become the calculated focal lengths.

INDUSTRIAL APPLICABILITY

The present invention is applicable as a zoom lens which is able to be easily configured, and is capable of shortening a required time at the time of changing a magnification ratio.

REFERENCE SIGNS LIST 10A, 10B, 10C—zoom lens, 12, 22—first lens unit, 14, 24—second lens unit, 16, 26—control unit, 28—laser light source, 30—reflection type spatial light modulator, 30a—light-reflecting surface, 30b—first lens unit, 30c—second lens unit, 32—spatial filter, 34—collimating lens, 36a to 36e—reflecting mirror, A, A1 to A3—optical axis, F—focal plane, $f_1$, $f_2$—focal length, $f_c$—combined focal length.

The invention claimed is:

1. A zoom lens comprising:
a reflection type spatial light modulator having a single light-reflecting surface that includes a first region and a second region, the second region being optically coupled between the first region and a focal plane of the zoom lens; and
a control unit configured to provide a lens pattern to the reflection type spatial light modulator for displaying a first lens having a first focal length on the first region and displaying a second lens having a second focal length on the second region, and control the first focal length and the second focal length, wherein
a distance between the first region and the second region, and a distance between the second region and the focal plane are both invariable, and
the control unit changes a magnification ratio of the zoom lens by changing the first focal length and the second focal length.

2. The zoom lens according to claim 1, comprising a plurality of reflective elements, wherein the second region is optically coupled to the first region via the plurality of reflective elements.

3. The zoom lens according to claim 1, wherein the control unit provides the lens pattern with which a straight line including a central axis line of light input to the first region and a straight line including a central axis line of light output from the second region are separated from one another, to the reflection type spatial light modulator.

4. The zoom lens according to claim 1, wherein the control unit provides the lens pattern with which, with respect to light input to the first region, light output from the second region is split into a plurality of optical paths, to the reflection type spatial light modulator.

5. The zoom lens according to claim 1, wherein the control unit superimposes a pattern for correcting aberrations generated in the zoom lens, onto the lens pattern to be provided to the reflection type spatial light modulator.

6. The zoom lens according to claim 1, wherein the control unit calculates the first focal length and the second focal length on the basis of a combined focal length by the first lens and the second lens, the distance between the first region and the second region, and the distance between the second region and the focal plane, and changes the first focal length and the second focal length so that their focal lengths become the calculated focal lengths.

* * * * *